United States Patent [19]

Hummel

[11] Patent Number: 4,580,403
[45] Date of Patent: Apr. 8, 1986

[54] SOLID STATE THERMOSTATIC CONTROL SYSTEM FOR EVAPORATIVE COOLERS

[76] Inventor: Roger L. Hummel, 1539 Vanderbilt Dr., El Paso, Tex. 79935

[21] Appl. No.: 691,747

[22] Filed: Jan. 15, 1985

[51] Int. Cl.$^4$ .......................... F28D 3/00; F25D 17/00
[52] U.S. Cl. ......................................... 62/171; 62/180
[58] Field of Search .......................... 62/121, 171, 180

[56] References Cited

U.S. PATENT DOCUMENTS

| | | | |
|---|---|---|---|
| 3,398,889 | 8/1968 | Bohannan | 62/180 |
| 3,464,224 | 9/1969 | Swanson | 62/180 |
| 3,464,225 | 9/1969 | Watrous et al. | 62/180 |
| 3,877,243 | 4/1975 | Kramer | 62/187 |
| 4,232,531 | 11/1980 | Manoan, Jr. et al. | 62/180 |
| 4,325,225 | 4/1982 | Price | 62/180 |

Primary Examiner—Larry I. Schwartz
Attorney, Agent, or Firm—Don J. Flickinger

[57] ABSTRACT

In order to provide a control system for an evaporative cooler which is simple to install correctly and which affords a high degree of safety in use, there is disclosed a circuit employing opto-isolators to switch power triacs which, in turn, control the flow of a-c power to the water pump motor and to the low and high speed fan motor windings. Logic means ensure that energization of the low and high speed fan motor windings is mutually exclusive. The electronic switching devices are selected to afford a high degree of electrical isolation between the thermostat and potentially lethal voltages. The system is housed in a molded fiberglass box for long-term use in a damp environment.

18 Claims, 3 Drawing Figures

SOLID STATE THERMOSTATIC CONTROL SYSTEM FOR EVAPORATIVE COOLERS

FIELD OF THE INVENTION

This invention relates to the evaporative cooling arts and, more particularly, to an electronic control system for directing and controlling the operation of an evaporative cooler employed for cooling an enclosed space.

BACKGROUND OF THE INVENTION

Evaporative coolers have long been used to cool living spaces in regions of the world in which the ambient temperature is high and the ambient humidity is low. Some years ago, the use of evaporative coolers in the United States somewhat declined with the proliferation of full air conditioning refrigeration systems which are able to function effectively even when the humidity is higher than a level at which evaporative coolers are effective. However, in recent years, the remarkable increase in the cost of electrical power to the consumer has caused a resurgence in interest in and further development of evaporative coolers since evaporative coolers consume significantly less electrical energy than full air conditioning systems. It is not uncommon, for example, for homes and businesses across the southwestern United States to have dual cooling systems; i.e., both evaporative coolers and refrigeration. Evaporative coolers are employed during periods of low humidity to effectively cool the designated space and also, as is well known in the art, to "air out" the space since the evaporative cooler draws in outside air and requires that the space be open to the outside (as through screened in windows and doors) to obtain the necessary circulation.

It is therefore understood by those skilled in the cooling art that evaporative cooling, given the necessary ambient condition of low humidity, is very cost effective in providing cooling for homes and businesses.

A typical evaporative cooler includes a blower motor, usually a two speed unit, which draws outside air through a pad or other element. The pad or other element may be wetted such that evaporation from the wetted element removes heat from the incoming air which is subsequently forced into the living space and thence circulates through the openings provided to the outdoors. The wetted element across which the incoming air is drawn is continuously wetted by a small pump which delivers water from a water sump. The water sump is maintained at an appropriate level by a float/-valve hookup to a source of water, typically simply a normal cold water line. The blower motor may also be operated without the pump to simply draw outside air into the living space.

In the past, control systems for evaporative coolers have been rudimentary and, in some instances, dangerous. The most elementary control system is an on/off switch which controls the electrical power to the blower motor and water pump. Another such control system is referred to in the art as a "line voltage thermostat". This device is installed within the cooled structure and senses air temperature over a user-adjustable range of approximately 60 degrees F. to 90 degrees F. It responds by electrically switching one of the a-c power leads to the cooler's fan motor. These line voltage thermostats, while inexpensive, are inherently hazardous, unreliable, and cannot be Underwriters Laboratory listed. Most line voltage thermostats are designed and installed such that hazardous electrical voltages are present at or near the controls which are accessible to the user. Further, since most line voltage thermostats control the fan motor by switching one of the a-c power conductors, the device could be installed in series with the a-c common conductor. This type of installation contravenes the requirements of National Electrical Code, Article 380-2. Most dealers refuse to stock or sell line voltage thermostats because of their functional deficiencies and the potential of product liability claims.

Another prior art system employees a special evaporative cooler thermostat in conjunction with mechanical relay logic communicating on Class 2 wiring and voltages (i.e., low voltage, hence safer). This prior art system, however, has three distinct disadvantages: 1. it is expensive, 2. reliability is poor (mainly due to the use of mechanical relay logic), and 3. it is sufficiently complex to install as to be difficult for the ordinary handyman to achieve correct installation.

Thus, those skilled in the evaporative cooling arts will appreciate that it would be highly desirable to provide a cooler control system which is relatively inexpensive, very reliable, and very easy to install as well as being safe and approved by the appropriate testing laboratories and government agencies.

OBJECTS OF THE INVENTION

It is therefore a broad object of my invention to provide improved means for directing and controlling the operation of an evaporative cooler.

It is another object of my invention to provide such means which are inherently safe and easy to install.

It is a more particular object of my invention to provide such means which do not employ mechanical relay logic to control the fan and pump motors of an evaporative cooler.

It is a still more specific object of my invention to provide such means which employs solid state electronics carefully configured to be safe and reliable in operation and safe and simple to install.

In another aspect, it is an object of my invention to provide such means which are housed in a manner particularly adapted to achieve ready and safe installation and long life in operation.

SUMMARY OF THE INVENTION

Briefly, these and other objects of the invention are achieved by coupling standard, low voltage control signals from a conventional or specially designed evaporative cooler thermostat to a solid state circuit in which the thermostat control signals are applied to opto-electronic isolators which, in turn, drive solid state power switching units to control the flow of current to the pump motor and to the low and high speed windings of the fan motor. The control system is contained within a molded fiberglass box which is of such size that it can easily be installed within the housing of a standard evaporative cooler. The box is designed and constructed to be suitable for use in damp locations. The entire electronic assembly is suspended from a metal coverplate which also functions as lid for the fiberglass box as a heatsink for the power switching devices employed to control current flow to the fan motor windings. Power input leads of sufficient gauge are fed through the coverplate by means of a strain relief device. Similarly, the power output leads to the fan motor, of suitable gauge, are brought through a strain relief device and terminate in appropriate connectors, such as snap on terminals, for connection to the fan motor. A three conductor receptacle in the coverplate receives a conventional plug from the pump motor. An aperture is provided through the coverplate for receiving a multiconductor control cable from the thermostat which is installed in the living space.

DESCRIPTION OF THE DRAWING

The subject matter of the invention is particularly pointed out and distinctly claimed in the concluding portion of the specification. The invention, however, both as to organ-ization and method of operation, may best be understood by reference to the following detailed description taken in conjunction with the accompanying drawing of which:

DETAILED DESCRIPTION OF THE INVENTION

Figure 1:
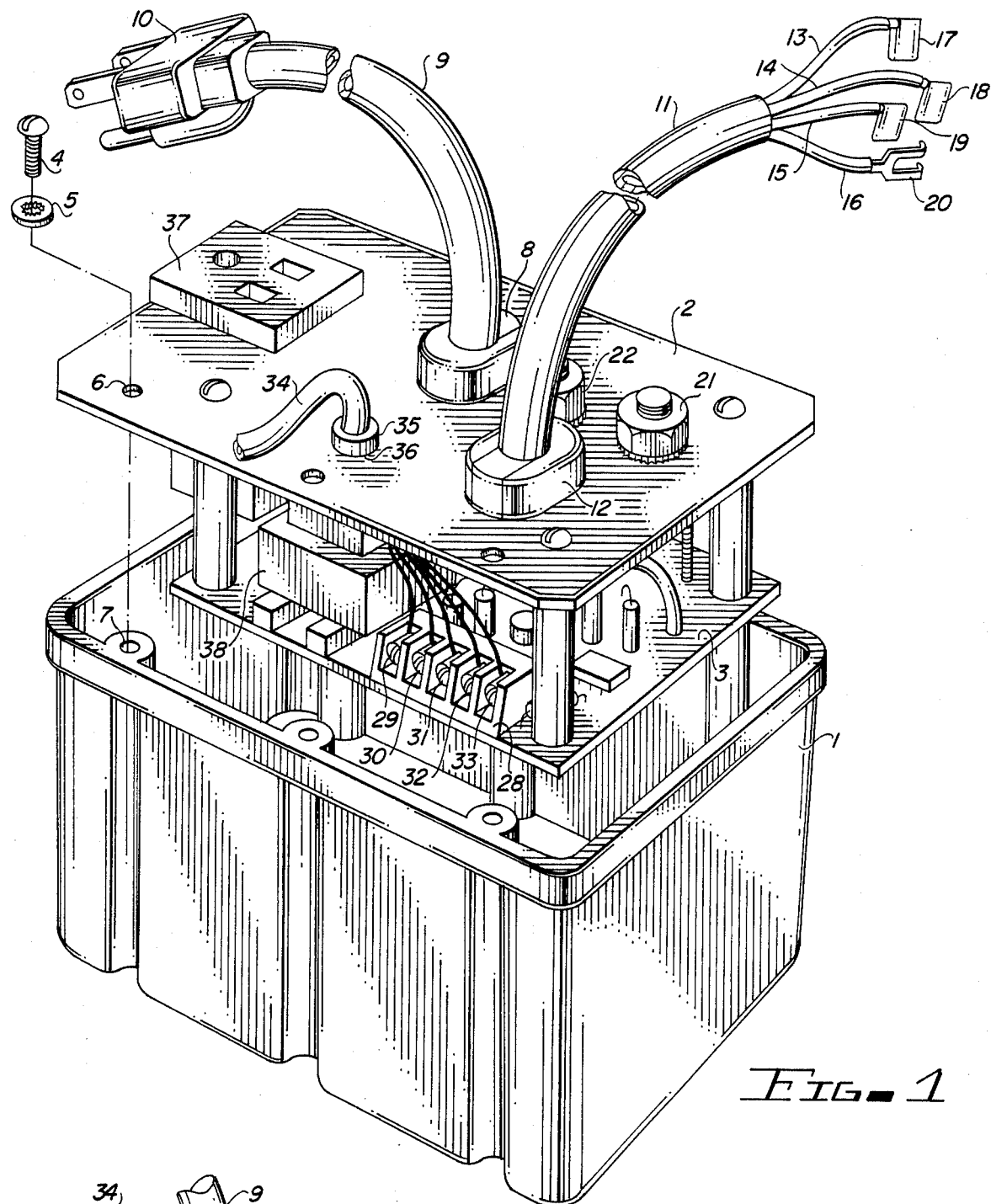
FIG. 1 is a pictorial view of the control system housing shown with the top plate partially withdrawn in order to illustrate a preferred orientation of the electronic module within the housing.

Refering now to FIG. 1, there is shown a housing 1, which may be usefully fabricated from a material, such as fiberglass, which will neither rust nor absorb water. Metal coverplate 2, from which is suspended a printed circuit board 3, is shown partially withdrawn from the housing 1 in order to illustrate the system packaging arrangement. The coverplate 2 is preferably fabricated from a material, such as type 1100-H14 aluminum, which is characterized by a high coefficient of thermal conductivity. It will be understood that, during operation, the coverplate 2 is positioned flush with the top opening of the housing 1 and fixed in place as by means of a series of fasteners such as the screw 4 which passes through a lockwasher 5, aperture 6 and through the coverplate 2 for threaded engagement with aperture 7 which may be integrally molded into the housing 1. Three positions for such screw fasteners are shown on the near side of the housing in FIG. 1, and it will be understood that three counterpart fastener positions are provided on the opposite side of the housing 1.

Extending through the coverplate 2 and held in position by strain reliever 8 is a power cord 9 which terminates in a conventional three-prong plug 10. The plug 10 is inserted into any convenient standard receptacle to provide power to the system. Similarly, a four conductor cord 11, passing through the coverplate 2 and held in place by strain reliever 12, is employed to connect the control system to the fan motor. The four conductors 13, 14, 15, 16 of the cord 11 terminate, respectively, in snap-on terminals 17, 18, 19, and fork terminal 20 to mate with standard connectors (not shown) which are typically provided on evaporative cooler fan motors.

Figure 2:
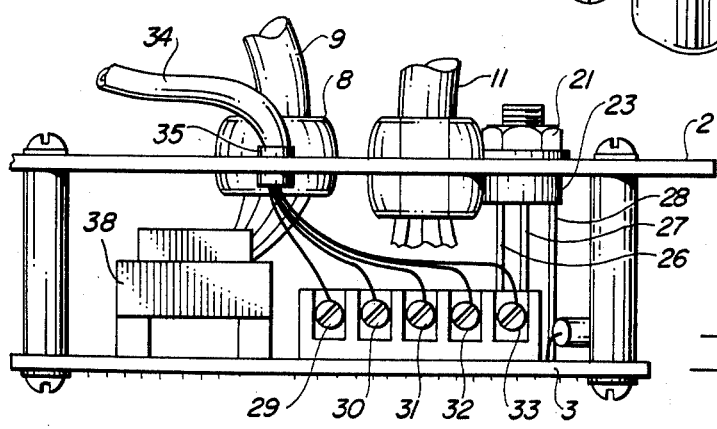
FIG. 2 is a partial side view of the metal housing cover illustrating more particularly the support arrangement for the electronics module within the housing.

Also fixed to the coverplate 2 by means of nuts 21, 22 are power triacs of which triac 23 can be seen in FIG. 2. Triac 23 is connected to printed wiring board 3 by leads 26, 27, 28. Those skilled in the art will readily appreciate that this configuration permits the top plate 2 to function as a heat sink for the power triacs which, as will become more evident below, directly control the current flow to the low and high speed windings of the cooler fan motor.

The terminal board 28, provided with lead-receiving screw positions 29, 30, 31, 32, 33, is affixed to the printed wiring board 3 and serves to connect the low voltage control leads from the evaporative cooler thermostat to the control system. The control leads from the standard thermostat are brought into the control system via a four or five conductor cable 34 which passes through a bushing 35 inserted into an aperture 36 in the coverplate 2.

A conventional three conductor a-c power receptacle 37 is provided in the coverplate 2 and, as will become evident from the discussion of the circuit below, is connected to the electronic circuitry carried by printed circuit board 3 which is adapted to provide power to the pump motor which may simply be plugged into the receptacle 37. An isolation transformer 38 carried on the printed circuit board 3 serves, as will also become evident below, to isolate the control circuitry from the power circuitry of the system.

Figure 3:
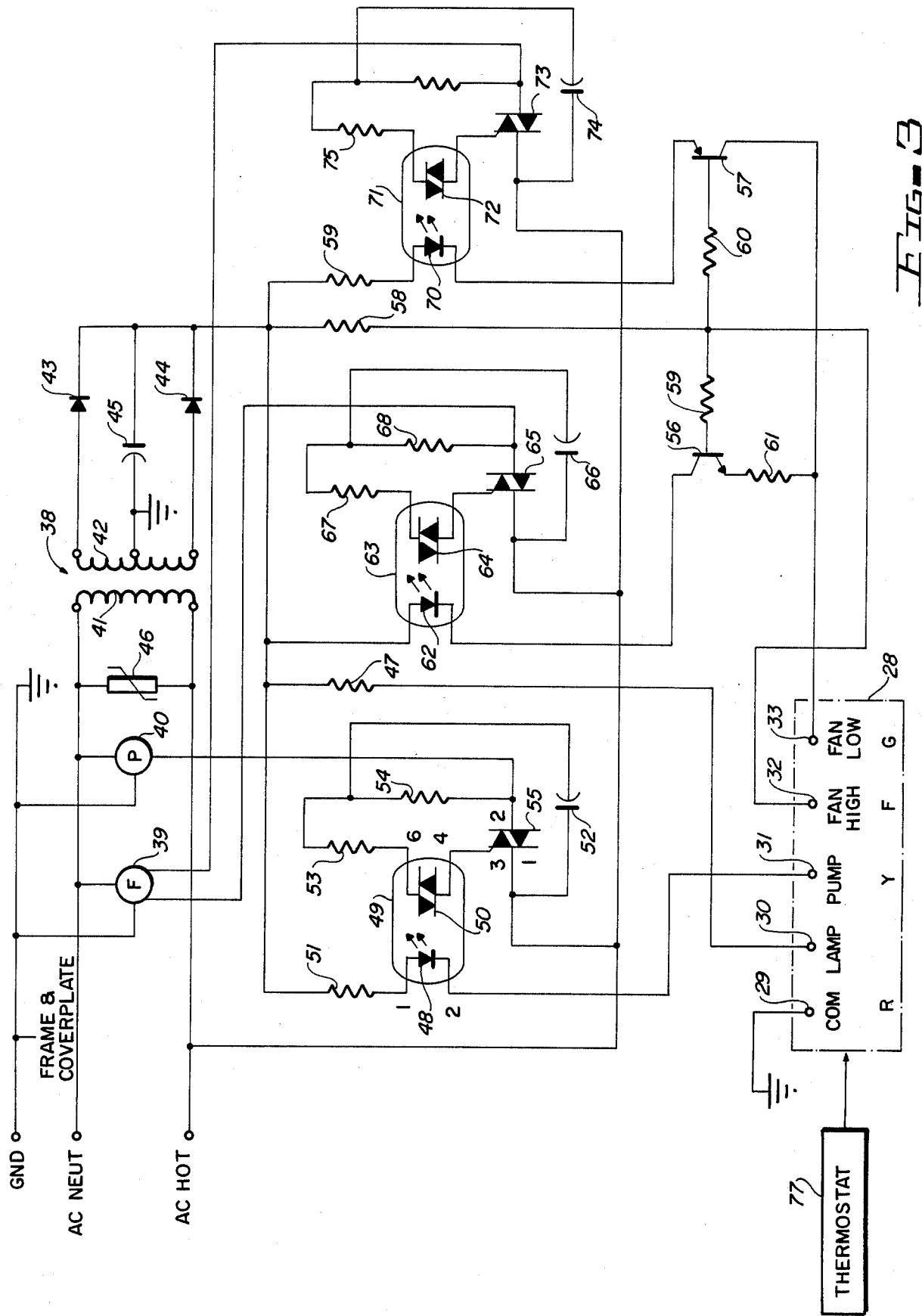
FIG. 3 is a schematic diagram of the electronics assembly disposed within the housing shown in FIG. 1.

Consider now FIG. 3 which is a full schematic diagram of the control system of the present invention. In accordance with conventional and accepted practice, power is brought into the system in a three line configuration; viz.: earth ground, a-c neutral, and a-c hot. Earth ground potential is connected to the frame and coverplate of the control unit at two separate points as a safety precaution and to ensure that exposed metal parts will not become electrically energized. Earth ground potential is also connected to the housings (not shown) of the fan motor 39 (via fork terminal 20) and pump motor 40 (via the ground contact in receptacle 37). A-C neutral and a-c hot are applied across the primary winding 41 of isolation transformer 38. The secondary winding 42 of transformer 38 is center tapped, with the center tap being connected to signal ground and the winding ends connected to anodes of respective rectifiers 43 and 44 which have their cathode terminals connected together. A filter capacitor 45 is disposed between signal ground potential and the common cathode electrical point. Those skilled in the electronic arts will immediately recognize a conventional full wave rectifier providing a positive d-c voltage at the cathodes of the rectifiers 43, 44. Surge supressor 46 is disposed in parallel with the primary winding 41 of isolation transformer 38 to dampen power line surges which could damage the electronic circuitry of the system. The turns ratio of the primary winding 41 and secondary winding 42 of the isolation transformer 38 are selected to provide a d-c output voltage from the full wave rectifier of about ten volts.

As previously mentioned, terminal board 28 is connected to either a conventional or special purpose evaporative cooler thermostat 77. Characteristics of the thermostat interface of the system of the present invention are as follows:

(A) The common terminal 29 is a signal ground.

(B) The terminal 30 may be connected to one or more indicator lamps integral with the special-purpose thermostat. Terminal 30 is energized, through dropping resistor 47, when power is applied to the system.

(C) Terminal 31 presents an open circuit when the pump is to be off and a signal ground circuit when the pump is to be on.

(D) When the fan is to be completely off, the signal presented by the conductor attached to fan high terminal 32 can be either an open or signal ground, and the conductor attached to the fan low terminal 33 must present an open. When the fan is to run at low speed, the conductor attached to the fan low terminal 33 must present a signal ground potential, and the conductor attached to the fan high terminal 32 must present an open. When the fan is to run at high speed, the conductors attached to the fan low terminal 33 and the fan high terminal 32 must each present a signal ground potential to the control system.

While this switching logic may, at first, appear to be unusual, it is, in fact, the sequence provided by a conventional evaporative cooler thermostat manufactured by Honeywell, Inc. and designated as Model T822C-1181 thermostat and Model Q634J-1005 subbase. This switching logic arrangement was also chosen because, as will be understood upon further examination, there is no combination of open and ground signals which well result in selecting both the fan high and fan low speeds simultaneously. This feature of the system is a safety precaution to prevent both fan motor windings being concurrently energized, a condition which would damage the fan motor any could cause an overheating condition.

Consider now the operation of the circuit. When it is desired to energize the pump (which may be prior to energizing the fan in order to pre-wet the pad or other wetted element), a signal ground potential is applied to the terminal 31 from the thermostat 77 (which includes a conventional switch for carrying out this function). As a result, current flows from the d-c power source through current limiting resistor 51 and through the light-emitting diode element 48 of an opto-isolator 49 which also includes light-actuated triac 50. Inasmuch as there is no electrical connection between the light-emitting diode and the light-actuated triac, a high degree of electrical isolation (typically on the order of 1500 volts a-c) is provided, thus ensuring that hazardous voltages are not reflected back into the user-accessible controls on the thermostat. The opto-isolator 49 is a commercially available unit of which many examples are suitable. One specific model applicable for use in the present invention is: Type H11J5 manufactured by the General Electric Company.

Illumination of the light-emitting diode 48 switches the signal level light-actuated triac 50 into the conducting state. Triac 50 receives power from the a-c hot line through capacitor 52 which is connected to the junction of voltage dropping resistors 53, 54. Capacitor 52 serves another function to be specified below.

When the light-actuated triac 50 is switched into the conducting state, it enables the control electrode of power triac 55 which switches to its conductive state and thereby places the pump motor 40 directly in circuit across the a-c line such that the pump is energized and begins to circulate water across the wetted element. Subsequently, when the pump is turned off from the thermostat by opening the circuit to the terminal 31, thereby extinguishing the light-emitting diode 48, turning off the signal triac 50, and turning off the power triac 55, capacitor 52 serves to swamp any back e.m.f. spikes from the pump motor which could damage the circuitry or cauuse power triac 55 to be falsely retriggered.

Power triac 55 need only be capable of switching current sufficient to run the relatively small pump motor 40 and dissipating a corresponding amount of heat generated internal to the triac. It has been found that, by way of example, a Type 2006L4 triac (available from Teccor) fitted with an attachable heatsink will perform this function with a generous degree of reserve. This exemplary type and style of triac was selected for use in the circuit because it provides a high degree of electrical isolation (typically on the order of 1600 volts a-c) between the electrodes and the case. This electrical isolation characteristic coupled with the electrical isolation characteristics of the opto-isolator, described earlier, provides a double isolation feature which ensures that hazardous voltages will not be transferred back to the user-accessible controls on the thermostat.

When it is desired to start the fan, the characteristics of the standard evaporative cooler thermostat switching system, as previously noted, are such that, for fan low, a signal ground potential is presented at terminal 33 and an open at terminal 32. As a result, the base electrodes of both transistors 56 and 57 (which comprise a logic circuit to interpret the thermostat control signals) are "high" because of the connection through resistor 58 to the d-c power supply. Resistors 59 and 60 are simply conventional isolation/biasing resistors. The emitter electrode of the transistor 56 is connected, through dropping resistor 61, to signal ground potential available from the thermostat at the terminal 33. Thus, the circuit through transistor 56 is complete and, as a result, light-emitting diode 62 of opto-isolator 63 is illuminated. Inasmuch as there is no electrical connection between the light-emitting diode and the light-actuated triac, a high degree of electrical isolation (typically on the order of 1500 volts a-c) is provided, thus ensuring that hazardous voltages are not reflected back into the user-accessible controls on the thermostat.

Illumination of the light-emitting diode 62 actuates signal level light-actuated triac 64 within the opto-isolator 63 which results in enabling the control electrode of power triac 65 to place the low speed windings of the fan motor 39 across the a-c line in a manner similar to that described in conjunction with the pump motor circuitry. The type and style of power triac 65 selected for use in the circuit must not only provide the requisite power handling capacity, but also must provide a high degree of isolation (preferably on the order of 1600 volts a-c) in order to achieve a double isolation characteristic which ensures that hazardous voltages will not be transferred back to the user-accessible controls on the thermostat. Capacitor 66 and resistors 67 and 68 serve functions corresponding to capacitor 52 and resistors 53, 54 as already described. Resistor 61 limits the current passing through light-emitting diode 62 and hence serves an additional function corresponding to resistor 51 as already described.

As previously noted, when the thermostat switching circuit is thrown to the high fan speed position, both terminals 32 and 33 are placed at signal ground potential. Therefore, the tie point between resistors 58, 59, 60 is also established at signal ground potential. This serves to cut off the transistor 56 and extinguish the light-emitting diode 62 to terminate current feed to the low speed winding of the fan motor 39. Simultaneously, the transistor 57 is enabled to establish the circut between the d-c power supply through current limiting resistor 69 and through light-emitting diode 70 of opto-isolator 71. As a result, signal level light-actuated triac 72 of opto-isolator 71 is turned on to, in turn, to enable the control electrode of power triac 73 to thereby throw the high speed winding of fan motor 39 across the a-c line. Again, the opto-isolator and power triac in this circuit section should be chosen to provide a high degree of electrical isolation and safety as described previously. Capacitor 74 and resistors 75, 76 serve the same functions as previously noted with respect to the pump motor circuit section.

Power triacs 65 and 73 must switch subsantially more current than power triac 55. Referring back to FIG. 2, it may be noted that power triac 23 is, in effect, the same element as power triac 73 shown in FIG. 3. These are large units carefully mounted for good heat transfer relationship with the coverplate 2 which acts as a heatsink. Commercially available power triacs Type 5025V6 have been found to readily handle the current associated with relatively large capacity fan motors with an adequate degree of reserve and also achieve the desired electrical isolation which contributes significantly to the safety of the system in use.

The ease with which the system according to the present invention may be installed, even by one of relatively limited skills, will be apparent. By way of example, it is only necessary to feed the cable 34 (FIGS. 1,2) from the conventional evaporative cooler thermostat 77 (FIG. 3) through the bushing 35 and the coverplate 2 for connection to the terminal board 28 according to conventional color coding standards or written instructions provided to the user. The cover is then fixed in place by the screws 4 (or such other means as may be provided), the pump motor plugged into the receptacle 37, the terminals 17, 18, 19 snapped into place on the fan motor with the ground fork terminal 20 being connected at any suitable place to the motor housing, and the unit plugged into a source of power with the plug 10. As result, very safe installation is readily carried out without the need to cut, strip, or splice a single electrical conductor which carries potentially lethal voltages. It will be clear from the above discussion of the circuitry that the thermostat is absolutely isolated from dangerous voltage levels.

While the principles of the invention have now been made clear in an illustrative embodiment, there will be immediately obvious to those skilled in the art many modifications of structure, arrangements, and components used in the practice of the invention which are particularly adapted for specific environments and operating requirements without departing from those principles.

I claim:

1. A control system for an evaporative cooler, which evaporative cooler includes a pump motor and a blower motor having low and high speed windings, said control system including:
  (A) a means for making electrical connections to a thermostat, which thermostat is adapted to selectively provide open and ground control signals as follows:
    I. a ground signal at a first electrical point when the pump motor winding is to be energized, and an open signal at said first electrical point when the pump motor winding is to be deenergized;
    II. a ground signal at a second electrical point when the fan motor windings are to be energized, and an open signal at said second electrical point when the fan motor windings are to be deenergized; and
    III. a ground signal at a third electrical point when the fan motor high speed winding is to be energized, and an open signal at said third electrical point when the fan motor low speed winding is to be energized;
  (B) an electronic control circuit electrically disposed between said thermostat and the windings of the pump and fan motors, said control circuit comprising:
    I. a first power switching electronic device connected in series between one side of a conventional source of a-c power and one side of the pump motor winding;
    II. a second power switching electronic device connected in series between one side of a conventional source of a-c power and one side of the fan motor low speed winding;
    III. a third power switching electronic device connected in series between one side of a conventional source of a-c power and one side of the fan motor high speed winding;
    IV. each of said first, second, and third power switching electronic devices including a control electrode which, when an enabling signal is applied thereto, renders said power switching electronic device conductive, thereby completing a circuit to the winding to which it is connected to energize the winding;
    V. a source of d-c power;
    VI. a first control level switching device having an input connected in series between said d-c power source and said first electrical point and an output connected in circuit with said control electrode of said first power switching means such that when a ground signal appears at said first electrical point, current flows from said d-c power source through said input of said first control level switching device to said first electrical point and said output of said first control level switching device responds by issuing an enabling signal to said control electrode of said first power switching electronic device;
    VII. a logic circuit connected to said second and third electrical points;
    VIII. a second control level switching device having an input connected in series between said d-c power source and said logic circuit and an output connected in circuit with said control electrode of said second power switching means such that when said logic circuit establishes a current drain condition to said input of said second control level switching device, current flows from said d-c power source through said input of said second control level switching device, and said output of said second control level switching device responds by issuing an enabling signal to said control electrode of said second power switching electronic device;
    IX. a third control level switching device having an input connected in series between said d-c power source and said logic circuit and an output connected in-circuit with said control electrode of said third power switching means such that when said logic circuit establishes a current drain condition to said input of said third control level switching device, current flows from said d-c power source through said input of said third control level switching device, and said output of said third control level switching device responds by issuing an enabling signal to said control electrode of said third power switching electronic device;

X. said logic circuit being adapted and configured to:
  a. respond to the appearance of a ground signal at said second electrical point and an open signal at said third electrical point by establishing a current drain condition to said input of said second control level switching device, but not to said input of said third control level switching device;
  b. respond to the appearance of a ground signal at both second and third electrical points by establishing a current drain condition to said input of said third control level switch, but not to said input of said second control level switch; and
  c. respond to the appearance of any other combination of signals at said second and third electrical points by not establishing a current drain condition to the inputs of either said second or third control level switches.

2. The control system of claim 1 in which at least one of said first, second, and third control level switching devices is an opto-isolator.

3. The control system of claim 1 or 2 in which at least one of said power switching electronic devices is a power triac.

4. The control system of claim 1 which further includes:
  (A) a housing for said electronic control circuit, said housing being fabricated from a material resistant to rust and resistant to the ingress or absorption of moisture, said housing having an opening on one side only thereof;
  (B) a metal coverplate for closing off said opening in said housing;
  (C) means for affixing said coverplate to said housing;
  (D) means for suspending said electronic control circuit from said metal coverplate; and
  (E) means for reliably connecting said metal coverplate to earth ground.

5. The control system of claim 2 which further includes:
  (A) a housing for said electronic control circuit, said housing being fabricated from a material resistant to rust and resistant to the ingress or absorption of moisture, said housing having an opening on one side only thereof;
  (B) a metal coverplate for closing off said opening in said housing;
  (C) means for affixing said coverplate to said housing;
  (D) means for suspending said electronic control circuit from said metal coverplate; and
  (E) means for reliably connecting said metal coverplate to earth ground.

6. The control system of claim 3 which further includes:
  (A) a housing for said electronic control circuit, said housing being fabricated from a material resistant to rust and resistant to the ingress or absorption of moisture, said housing having an opening on one side only thereof;
  (B) a metal coverplate for closing off said opening in said housing;
  (C) means for affixing said coverplate to said housing;
  (D) means for suspending said electronic control circuit from said metal coverplate; and
  (E) means for reliably connecting said metal coverplate to earth ground.

7. The control system of claim 4 in which at least one of said power switching electronic devices is fixed to said metal coverplate in heat exchanging relationship therewith whereby said metal coverplate functions as a heatsink for said at least one power switching electronic device.

8. The control system of claim 5 in which at least one of said power switching electronic devices is fixed to said metal coverplate in heat exchanging relationship therewith whereby said metal coverplate functions as a heatsink for said at least one power switching electronic device.

9. The control system of claim 6 in which at least one of said power switching electronic devices is fixed to said metal coverplate in heat exchanging relationship therewith whereby said metal coverplate functions as a heatsink for said at least one power switching electronic device.

10. The control system of claim 4 in which said housing is fabricated of molded fiberglass.

11. The control system of claim 5 in which said housing is fabricated of molded fiberglass.

12. The control system of claim 6 in which said housing is fabricated of molded fiberglass.

13. The control system of claim 7 in which said housing is fabricated of molded fiberglass.

14. The control system of claim 8 in which said housing is fabricated of molded fiberglass.

15. The control system of claim 9 in which said housing is fabricated of molded fiberglass.

16. The control system of claim 1 or 2 in which at least one of said first, second, and third control level switching devices provides electrical isolation of at least 1500 volts a-c.

17. The control system of claim 1 or 2 in which at least one of said power switching electronic devices provides electrical isolation of at least 1500 volts a-c.

18. The control system of claim 3 in which at least one of said power switching electronic devices provides electrical isolation of at least 1500 volts a-c.

* * * * *